US011068532B2

(12) United States Patent
Croteau et al.

(10) Patent No.: US 11,068,532 B2
(45) Date of Patent: *Jul. 20, 2021

(54) INTERACTIVE IMAGE DISPLAY AND SELECTION SYSTEM

(71) Applicant: Horsetooth Ventures, LLC, Grosse Pointe Farms, MI (US)

(72) Inventors: Keith G. Croteau, Inverness, FL (US); Doran J. Geise, Topeka, KS (US)

(73) Assignee: Horsetooth Ventures, LLC, Grosse Pointe Farms, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/573,345

(22) Filed: Sep. 17, 2019

(65) Prior Publication Data

US 2020/0012677 A1 Jan. 9, 2020

Related U.S. Application Data

(63) Continuation of application No. 15/629,600, filed on Jun. 21, 2017, now Pat. No. 10,459,967, which is a
(Continued)

(51) Int. Cl.
*G06F 16/532* (2019.01)
*G06F 16/29* (2019.01)
(Continued)

(52) U.S. Cl.
CPC .......... *G06F 16/532* (2019.01); *G06F 3/0485* (2013.01); *G06F 3/04847* (2013.01); *G06F 16/29* (2019.01); *G06F 2203/04803* (2013.01)

(58) Field of Classification Search
None
See application file for complete search history.

(56) References Cited

U.S. PATENT DOCUMENTS

| 4,888,646 A | 12/1989 | Umeda et al. |
| 5,301,018 A | 4/1994 | Smidth et al. |

(Continued)

FOREIGN PATENT DOCUMENTS

| WO | WO 2014/165599 | 10/2014 |
| WO | WO 2016/058043 | 4/2016 |

OTHER PUBLICATIONS

U.S. Appl. No. 61/626,209, filed Sep. 21, 2011.
(Continued)

*Primary Examiner* — Nurun N Flora
(74) *Attorney, Agent, or Firm* — Craig R. Miles; CR Miles P.C.

(57) ABSTRACT

An interactive image selection and display system having a image selection and display application that makes maps, images, and media stored in one or more server computers available to client devices in a common format including a graphic user interface depicted on a display surface which allows a user to select within an interactive visual representation a target area and view a plurality of images presented in serial order concurrent with the presentation of a location identifier matched to each image on the display surface and to further select one or more of the plurality of images for concurrent still presentation on the display surface and to retrieve media associated with each selected image and to retrievably store the interactive visual representation, target area, selected images, and associated media as an image bucket file.

15 Claims, 9 Drawing Sheets

Related U.S. Application Data continuation of application No. 13/622,945, filed on Sep. 19, 2012, now Pat. No. 9,734,167.

(60) Provisional application No. 61/628,952, filed on Nov. 9, 2011, provisional application No. 61/626,209, filed on Sep. 21, 2011.

(51) Int. Cl.
  *G06F 3/0484* (2013.01)
  *G06F 3/0485* (2013.01)

(56) References Cited

U.S. PATENT DOCUMENTS

| | | | |
|---|---|---|---|
| 5,579,471 | A | 11/1996 | Barber et al. |
| 5,642,433 | A | 6/1997 | Lee et al. |
| 5,751,286 | A | 5/1998 | Barber et al. |
| 5,802,361 | A | 9/1998 | Wang et al. |
| 5,875,446 | A | 2/1999 | Brown et al. |
| 5,987,456 | A | 11/1999 | Ravela et al. |
| 6,006,218 | A | 12/1999 | Breese et al. |
| 6,115,717 | A | 9/2000 | Mehrotra et al. |
| 6,256,623 | B1 | 7/2001 | Jones |
| 6,297,748 | B1 | 10/2001 | Lappenbusch et al. |
| 6,321,226 | B1 | 11/2001 | Garber et al. |
| 6,363,373 | B1 | 3/2002 | Steinkraus |
| 6,445,834 | B1 | 9/2002 | Rising, III |
| 6,470,307 | B1 | 10/2002 | Turney |
| 6,522,782 | B2 | 2/2003 | Pass et al. |
| 6,523,021 | B1 | 2/2003 | Monberg et al. |
| 6,549,897 | B1 | 4/2003 | Katariya et al. |
| 6,556,710 | B2 | 4/2003 | Pass et al. |
| 6,578,032 | B1 | 6/2003 | Chandrasekar et al. |
| 6,643,641 | B1 | 11/2003 | Snyder |
| 6,704,729 | B1 | 3/2004 | Klein et al. |
| 6,728,752 | B1 | 4/2004 | Chen et al. |
| 6,748,387 | B2 | 6/2004 | Garber et al. |
| 6,748,398 | B2 | 6/2004 | Zhang et al. |
| 6,766,320 | B1 | 7/2004 | Wang et al. |
| 6,775,666 | B1 | 8/2004 | Stumpf et al. |
| 6,823,335 | B2 | 11/2004 | Ikeda et al. |
| 6,847,733 | B2 | 1/2005 | Savakis et al. |
| 6,901,411 | B2 | 5/2005 | Li et al. |
| 6,944,612 | B2 | 9/2005 | Roustant et al. |
| 6,978,275 | B2 | 12/2005 | Castellanos et al. |
| 7,010,751 | B2 | 3/2006 | Shneiderman |
| 7,017,114 | B2 | 3/2006 | Guo et al. |
| 7,047,482 | B1 | 5/2006 | Odom |
| 7,051,019 | B1 | 5/2006 | Land et al. |
| 7,065,520 | B2 | 6/2006 | Langford |
| 7,099,860 | B1 | 8/2006 | Liu et al. |
| 7,111,002 | B2 | 9/2006 | Zhang et al. |
| 7,113,944 | B2 | 9/2006 | Zhang et al. |
| 7,158,878 | B2 | 1/2007 | Rasmussen et al. |
| 7,430,566 | B2 | 9/2008 | Li et al. |
| 7,492,921 | B2 | 2/2009 | Foote |
| 7,499,916 | B2 | 3/2009 | Liu et al. |
| 7,617,176 | B2 | 11/2009 | Zeng et al. |
| 7,827,507 | B2 | 11/2010 | Geise et al. |
| 8,094,132 | B1 | 1/2012 | Frischling et al. |
| 9,363,463 | B2 | 6/2016 | Taneichi et al. |
| 9,734,167 | B2 * | 8/2017 | Croteau ............... G06F 3/0485 |
| 10,459,962 | B1 * | 10/2019 | Jayaraman .......... G06F 16/3329 |
| 2001/0049700 | A1 | 12/2001 | Ichikura |
| 2003/0023600 | A1 | 1/2003 | Nagamura et al. |
| 2003/0120526 | A1 | 6/2003 | Altman et al. |
| 2003/0126235 | A1 | 7/2003 | Chandrasekar et al. |
| 2004/0044469 | A1 | 3/2004 | Bender et al. |
| 2004/0225667 | A1 | 11/2004 | Hu et al. |
| 2004/0249774 | A1 | 12/2004 | Caid et al. |
| 2004/0267740 | A1 | 12/2004 | Liu et al. |
| 2006/0026152 | A1 | 2/2006 | Zeng et al. |
| 2006/0197781 | A1 | 9/2006 | Arutunian |
| 2006/0242178 | A1 | 10/2006 | Butterfield et al. |
| 2007/0174269 | A1 | 7/2007 | Jing et al. |
| 2007/0174865 | A1 | 7/2007 | Jing et al. |
| 2007/0174872 | A1 | 7/2007 | Jing et al. |
| 2007/0198182 | A1 | 8/2007 | Singh |
| 2007/0209025 | A1 | 9/2007 | Jing et al. |
| 2007/0244634 | A1 | 10/2007 | Koch et al. |
| 2007/0258642 | A1 | 11/2007 | Thota |
| 2008/0065321 | A1 | 3/2008 | Dacosta |
| 2008/0086468 | A1 * | 4/2008 | Jing ................... G06F 16/9537 |
| 2008/0086686 | A1 | 4/2008 | Jing et al. |
| 2008/0119167 | A1 | 5/2008 | Rao |
| 2008/0235584 | A1 | 9/2008 | Masham |
| 2009/0073161 | A1 | 3/2009 | Park et al. |
| 2009/0153492 | A1 * | 6/2009 | Popp ................... G06F 3/04883 |
| | | | 345/173 |
| 2010/0265186 | A1 | 10/2010 | Ryynanen |
| 2010/0332468 | A1 | 12/2010 | Cantrell |
| 2011/0145709 | A1 * | 6/2011 | Yoo ..................... G06F 16/4393 |
| | | | 715/730 |
| 2011/0231745 | A1 | 9/2011 | Levesque et al. |
| 2012/0011473 | A1 | 1/2012 | Ohkubo et al. |
| 2014/0267408 | A1 | 9/2014 | Mullins |
| 2015/0128089 | A1 | 5/2015 | Johnson et al. |
| 2016/0033295 | A1 | 2/2016 | Li et al. |

OTHER PUBLICATIONS

U.S. Appl. No. 61/628,952, filed Nov. 9, 2011.
Gogobot. Website, http://gogobot.com, originally downloaded Aug. 5, 2012, 5 total pages.
Ha. NYC Real Estate Startup RealDirect Adds Map Search and Compatibility Rankings. Website, http://techcrunch.com, originally downloaded May 9, 2012, 2 total pages.
Perez. Georama's Map-Based Travel Search Service Goes Live. Website, http://techcrunch.com, originally downloaded Jul. 23, 2012, 3 total pages.
Virtual Tourist. Website, http://www.virtualtourist.com, originally downloaded Dec. 27, 2011, 2 total pages.
Yelp. Website, http://www.yelp.com, originally downloaded Dec. 27, 2011, 1 total page.
U.S. Appl. No. 13/622,945, filed Sep. 19, 2012.
AIRBNB. Home page and search pages for Nashville, TN, United States. Website, http://www.airbnb.com, originally downloaded May 13, 2016, total 10 pages.
Geekwire. Winner of Expedia's first Seattle hackathon links concert and sports tickets to travel booking. Website, http://www.geekwire.com, originally downloaded Mar. 9, 2016, 9 pages total.
Google Earth. Get the world's geographic information at your fingertips. Website, http://www.google.com, originally downloaded Jul. 18, 2013, total 2 pages.
Google Earth. Rocky Mountains. Website, http://www.google.com, originally downloaded Apr. 15, 2013, total 2 pages.
Google Maps. Google Maps. Website, http://www.google.com, originally downloaded Oct. 7, 2013, total 1 page.
Realtor.com. Real Estate app. Website, http://www.realtor.com/mobile/, originally downloaded. Mar. 18, 2018, total 4 pages.
Redfin. Real Estate. Website, https://www.redfin.com , originally downloaded Jan. 15, 2018, total 3 pages.
Restaurants—Google. Restaurants—Google. Website, http://www.google.com, originally downloaded Sep. 11, 2013, total 1 page.
Tripwhat. Northwest Places. Website, http://tripwhat.com, originally downloaded Mar. 25, 2013, total 1 page.
Yelp. Hotels Steamboat Springs, CO 80487. Website, http://yelp.com, originally downloaded Jan. 31, 2014, total 3 pages.
Yelp. Website, http://www.yelp.com, originally downloaded Dec. 29, 2011, 1 total page.
Zillow. Real Estate. Website, http://zillow.com , originally downloaded Jan. 15, 2018, total 3 pages.
Zillow. Real Estate. Website, http://zillow.com, originally downloaded Dec. 24, 2013, total 3 pages.

* cited by examiner

FIG. 6

| 94 IMAGE ID | 95 X | 96 Y | IMAGE | 98 Database 1 | 99 Database N |
|---|---|---|---|---|---|
| 1 | 100 | 100 | IMAGEDATA | 100 HOTEL | 102 BEACH |
| 2 | 200 | 200 | IMAGEDATA | 101 RESTAURANT | 104 ITALIAN |
| 3 | 150 | 150 | IMAGEDATA | 100 HOTEL | MOUNTAINS |
| 4 | 300 | 250 | IMAGEDATA | 101 RESTAURANT | FRENCH |
| 5 | 400 | 300 | IMAGEDATA | RECREATION | SKIING |

FIG. 7

| 94 IMAGE ID | 95 X | 96 Y | IMAGE | 98 Database 1 | 99 Database N |
|---|---|---|---|---|---|
| 105 1 | 100 | 100 | IMAGEDATA | 100 HOTEL | BEACH |
| 2 | 200 | 200 | IMAGEDATA | 101 RESTAURANT | ITALIAN |
| 3 | 150 | 150 | IMAGEDATA | 100 HOTEL | MOUNTAINS |

INTERACTIVE IMAGE DISPLAY AND SELECTION SYSTEM

This United States Patent Application is a continuation of U.S. patent application Ser. No. 15/629,600, filed Jun. 21, 2017, now U.S. Pat. No. 10,459,967, issued Oct. 29, 2019, which is a continuation of U.S. patent application Ser. No. 13/622,945, filed Sep. 19, 2012, now U.S. Pat. No. 9,734,167, issued Aug. 15, 2017, which claims the benefit of U.S. Provisional Patent Application No. 61/628,952, filed Nov. 9, 2011, and U.S. Provisional Patent Application No. 61/626,209, filed Sep. 21, 2011, each hereby incorporated by reference herein.

I. FIELD OF THE INVENTION

An interactive image selection and display system having a image selection and display application that makes maps, images, and media stored in one or more server computers available to client devices in a common format including a graphic user interface depicted on a display surface which allows a user to select within an interactive visual representation a target area and view a plurality of images presented in serial order concurrent with the presentation of a location identifier matched to each image on the display surface and to further select one or more of the plurality of images for concurrent still presentation on the display surface and to retrieve media associated with each selected image and to retrievably store the interactive visual representation, target area, selected images, and associated media as an image bucket file.

II. BACKGROUND OF THE INVENTION

Conventional image display systems typically allow a user access to a single database to obtain images related to a word or phrase search. The word or phrase entered into a search engine may retrieve text and images in Web pages or retrieve other service applications which can be utilized by the user to search the corresponding database such as web mapping service applications, real estate sales applications, trip planning applications, or the like (collectively "service applications"). Web mapping service applications typically retrieve thematic maps or aerial or satellite images of an area. The user may then interact with the planar representation of a thematic map or aerial or satellite images to select one or more locations within a planar view of an area to retrieve and display on the thematic map or the aerial or satellite images one or more images from the database matched to the selected locations.

One substantial problem with conventional service applications may be that there is no interface which allows a user to concurrently access more than one database having images and data matched to a particular location selected by the user or to concurrently display those images and data separate from the aerial or satellite images on a display surface.

Another substantial problem with conventional service applications may be that there is no interface which allows the user to define the bounds of a target area within an aerial or satellite or graphic representation of an area to retrieve all the images and data matched to locations within the target area.

Another substantial problem with conventional service applications may be that there is no interface to allow and control serial presentation of each of a plurality of images and data matched to a corresponding plurality of locations within a selected target area of a aerial or satellite image in a discrete visual field with concurrent display of visual location indicators of each of the plurality of images in the target area of the aerial or satellite image.

Another substantial problem with conventional service applications can be that there may be no provision for selection of images and data matched to locations within a target area for concurrent still display in a visual field discrete from or outside of the representation of the aerial or satellite image or a selected target area.

Another substantial problem with conventional service applications can be that there may be no provision for further refined database search based on the selection of images and data matched to locations within a target area for concurrent still display discrete from or outside of the representation of the target area on a display surface.

Another substantial problem with conventional service applications may be that there is no provision for self-directed exploration of locations based on the user's particular interest.

Another substantial problem with conventional service applications may be that there is no provision to save selected images and associated media along with an interactive representation of the target area of the aerial or satellite image in an image package which retrievably reopens to allow a user to continue adjustment of the target area, view additional images serially displayed and select images for or delete images from an image package.

Another substantial problem with conventional service applications may be that there is no provision to share the image package with other users or travel providers for pricing.

The instant invention provides computer means, network means, and a computer-readable medium having computer-executable instructions which operates to addresses each of the above identified problems associated with the conventional service applications.

III. SUMMARY OF THE INVENTION

A broad object of the invention can be to provide an image selection and display system in the form of a computer readable medium having computer-executable instructions which makes maps, images, and media content stored on one or more computer servers available in a common format on one or more client devices interactive with a corresponding one or more users through the use of a graphic user interface which displays a visual representation of an area on a display surface which allows the user to select a target area within the visual representation of the area to concurrently display on the display surface in serial order a plurality of images matched to locations within the target area and to select a portion of the plurality of images for concurrent display on the display surface with the selected images along with associated media content storable as an image bucket file.

Another broad object of the invention can be to provide a user interface for depiction of an interactive visual representation of an area on a display surface where the visual representation of the area changes in response to user interactions to select a target area for retrieval of a plurality of images matched to locations within the target area and from which the user can select images for concurrent still display on the display surface and with the selected images and associated media content retrievably storable in an image bucket file.

Another broad object of the invention can be to provide a computer means and network means with the computer means being programmed to implement a graphic user interface which makes maps, images, and media content stored on one or more computer available in a common format on one or more client devices interactive with a corresponding one or more users through the use of a graphic user interface which displays a visual representation of an area on a display surface which allows the user to select a target area within the visual representation of the area to concurrently display on the display surface in serial order a plurality of images matched to locations within the target area and to select a portion of the plurality of images for concurrent still display on the display surface with the selected images along with associated media content storable as a image display file.

Naturally, further objects of the invention are disclosed throughout other areas of the specification, drawings, photographs, and claims.

IV. BRIEF DESCRIPTION OF THE DRAWINGS

Figure 5:
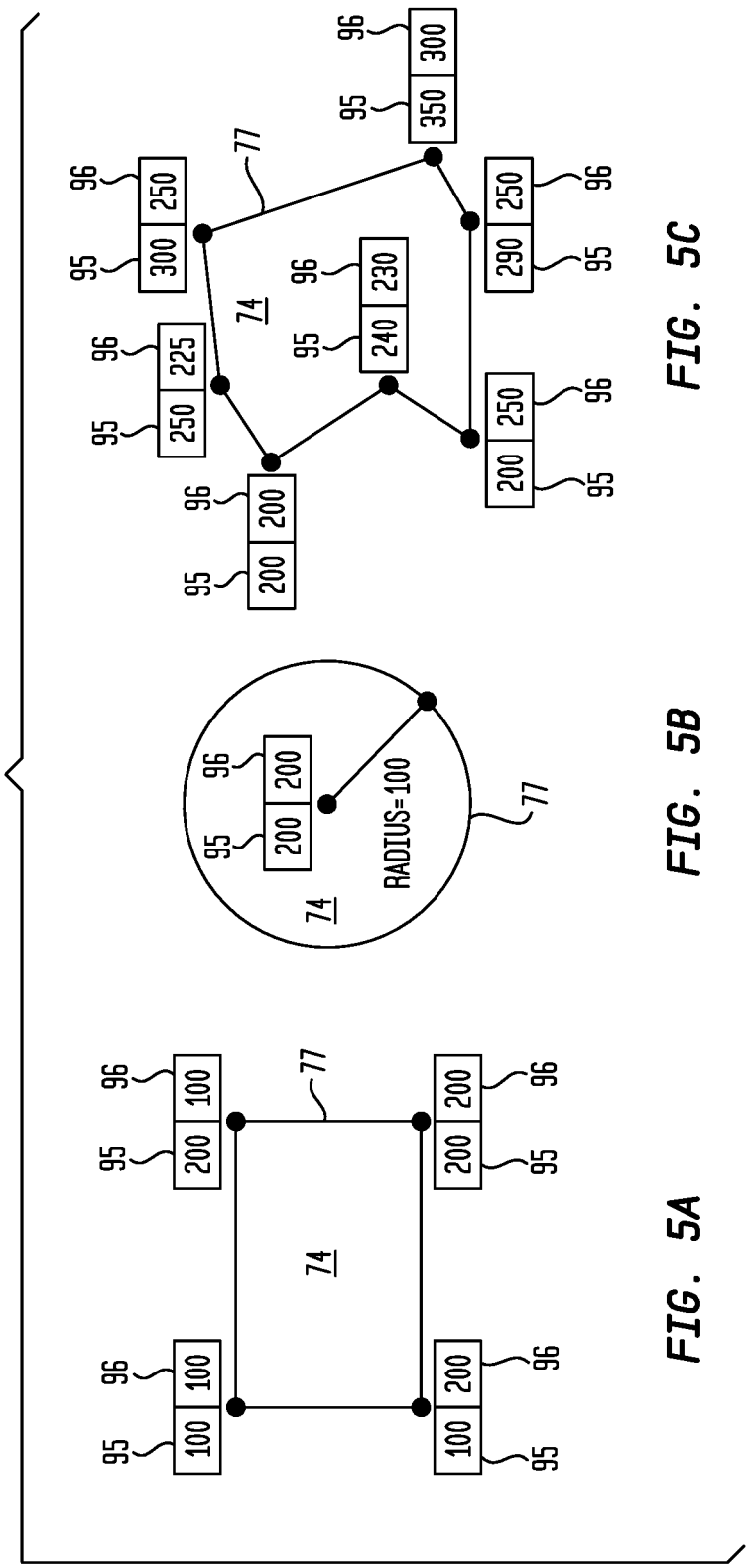

FIG. 5 is an illustration of particular embodiments of a visual frame which can be established in a visual representation of an area to define a database access definition for retrieval of a plurality of images from one or more server computers. FIG. 5A illustrates an embodiment of a visual frame which generates a database access definition as a population of location coordinates within the area defined by X/Y coordinates of the vertices of a polygon. FIG. 5B illustrates an embodiment of a visual frame which generates a database access definition as a population of location coordinates within the area of a radius sweep around X/Y coordinates of a center point. FIG. 5C illustrates an embodiment of a visual frame which generates a database access definition as a population of location coordinates within the area defined by the X/Y coordinates of the vertices of an irregular polygon.

FIG. 6 illustrates an embodiment of a data structure which lists all images retrievable from one or more server computers based on the database access definition of a visual frame generated in the visual representation of an area.

FIG. 7 illustrates an embodiment of a data structure which lists all the images for serial ordered display retrievable from one or more server computers based on the database access definition of a visual frame and further limited based on one or more selected image database categories.

Figure 8:
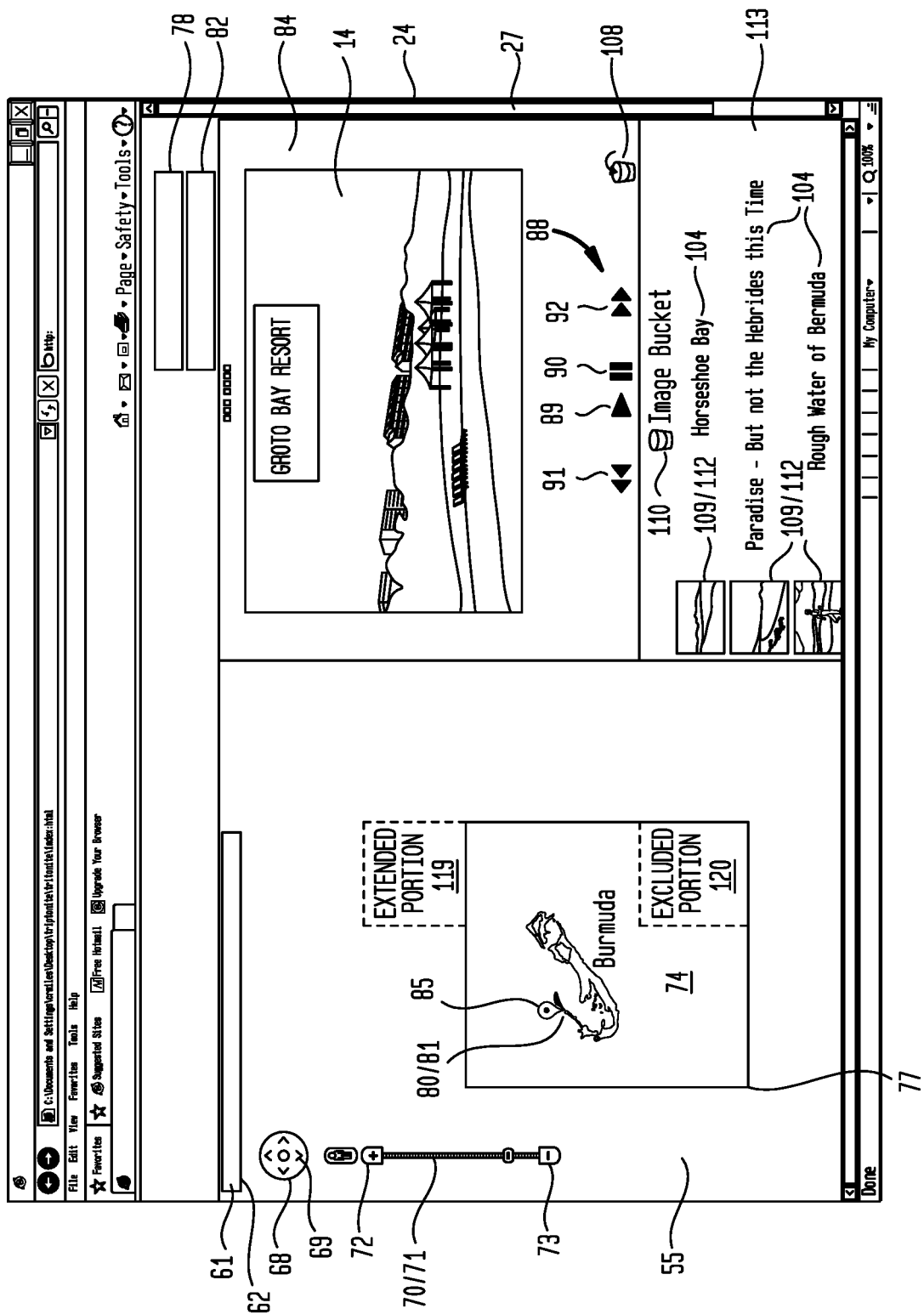

FIG. 8 is an illustration of a particular embodiment of a graphic user interface which allows a user to select particular images presented in serial order in the second visual field for still presentation in a third visual field.

Figure 9:
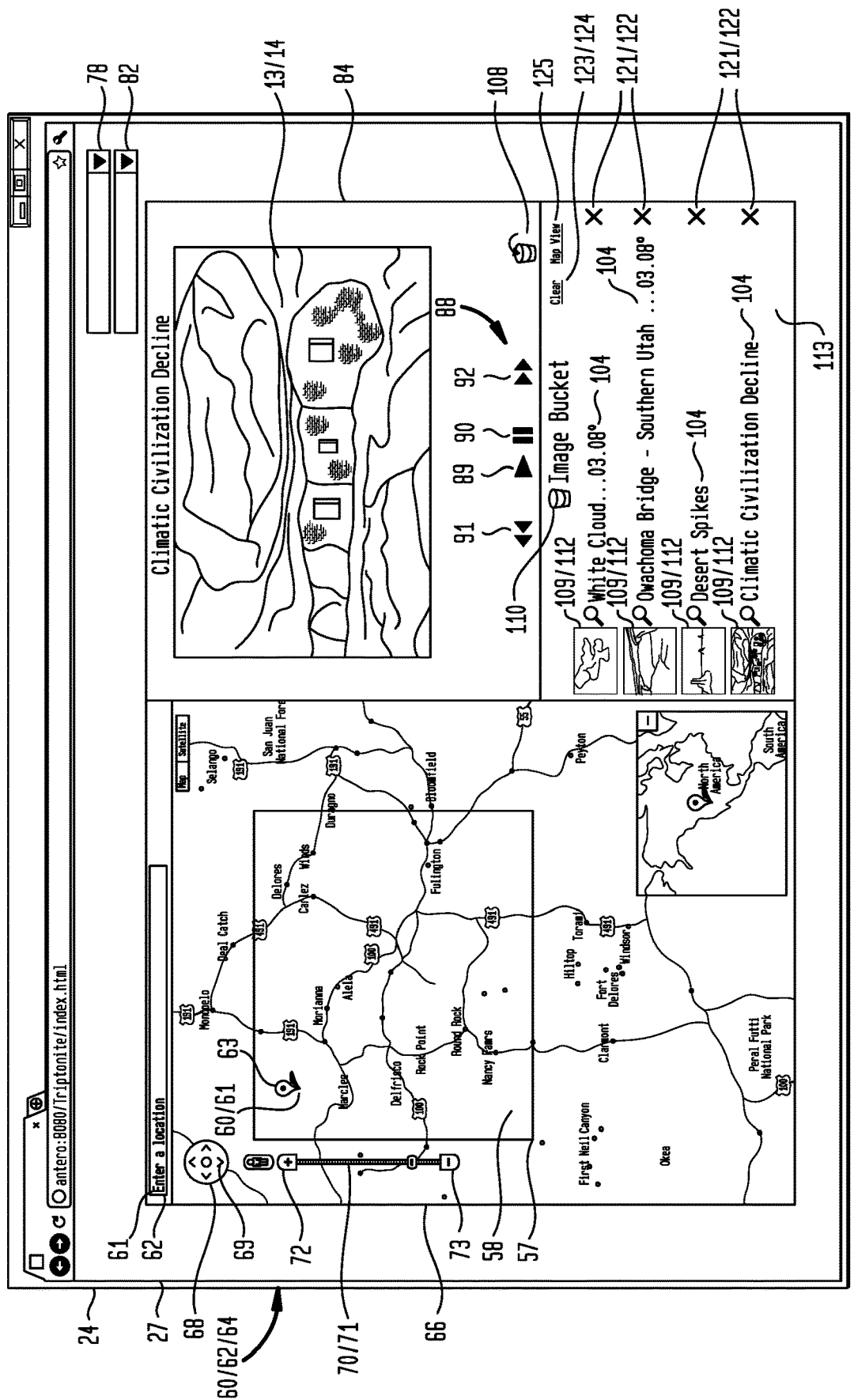

FIG. 9 is an illustration of a particular embodiment of a graphic user interface which allows a user to retrieve associated data or to delete particular images.

Figure 10:
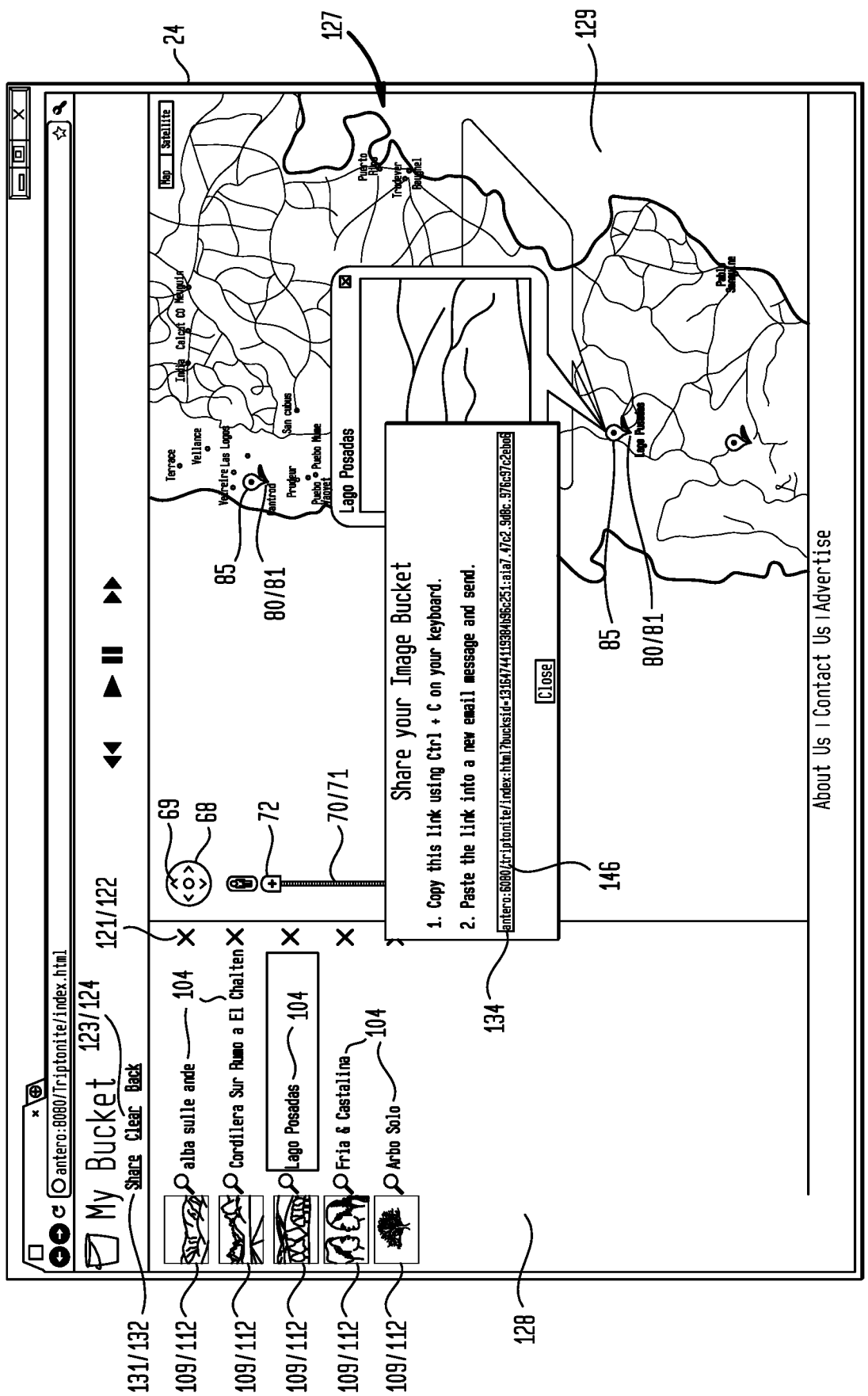

FIG. 10 is illustration of a graphic user interface which in a common data format allows a user to transfer or share the images presented in a third visual field and the associated data with another user.

V. DETAILED DESCRIPTION OF THE INVENTION

Figure 1:
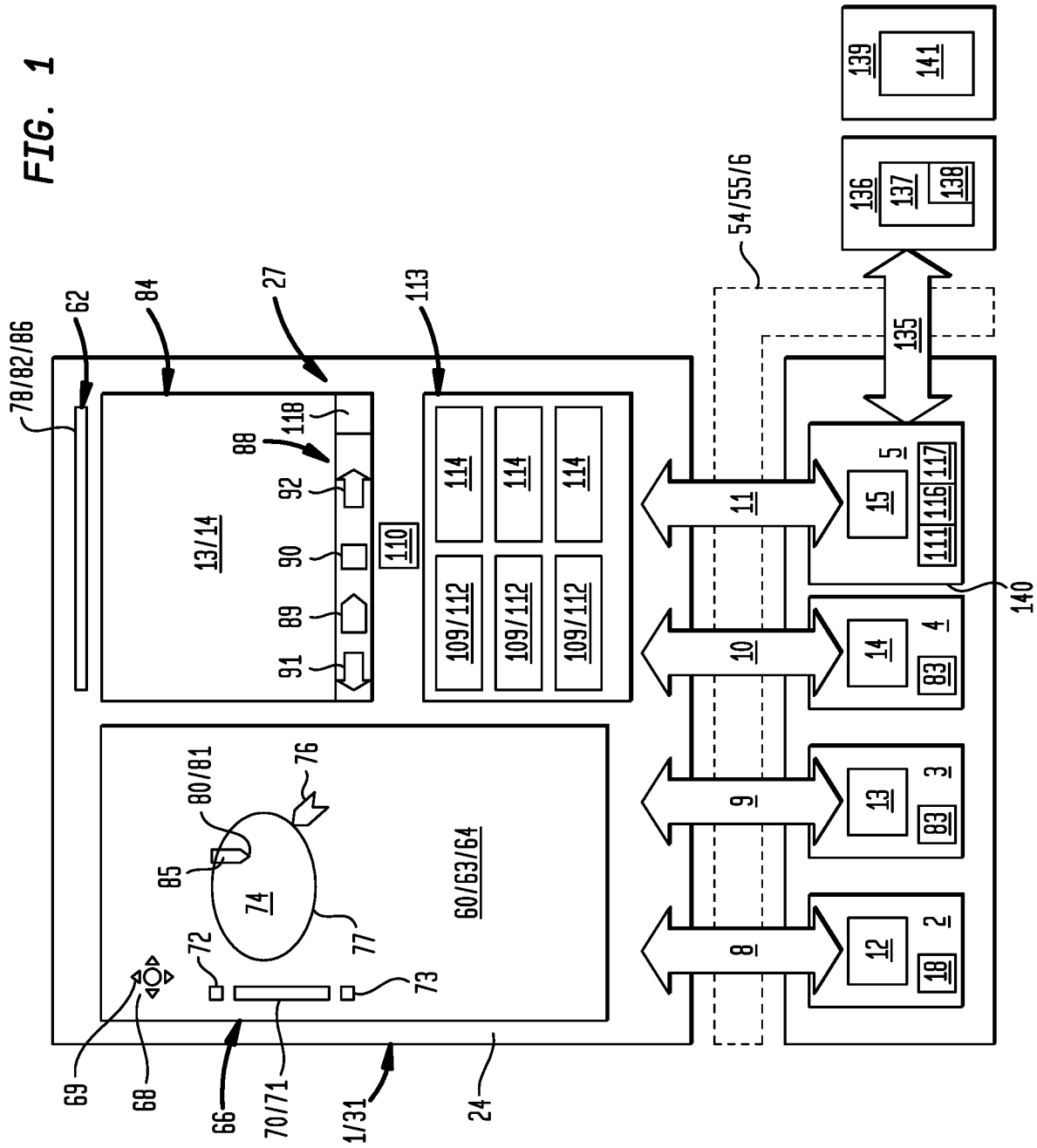
FIG. 1 is a block diagram of a particular embodiment of an interactive image selection and display system.
Figure 2:
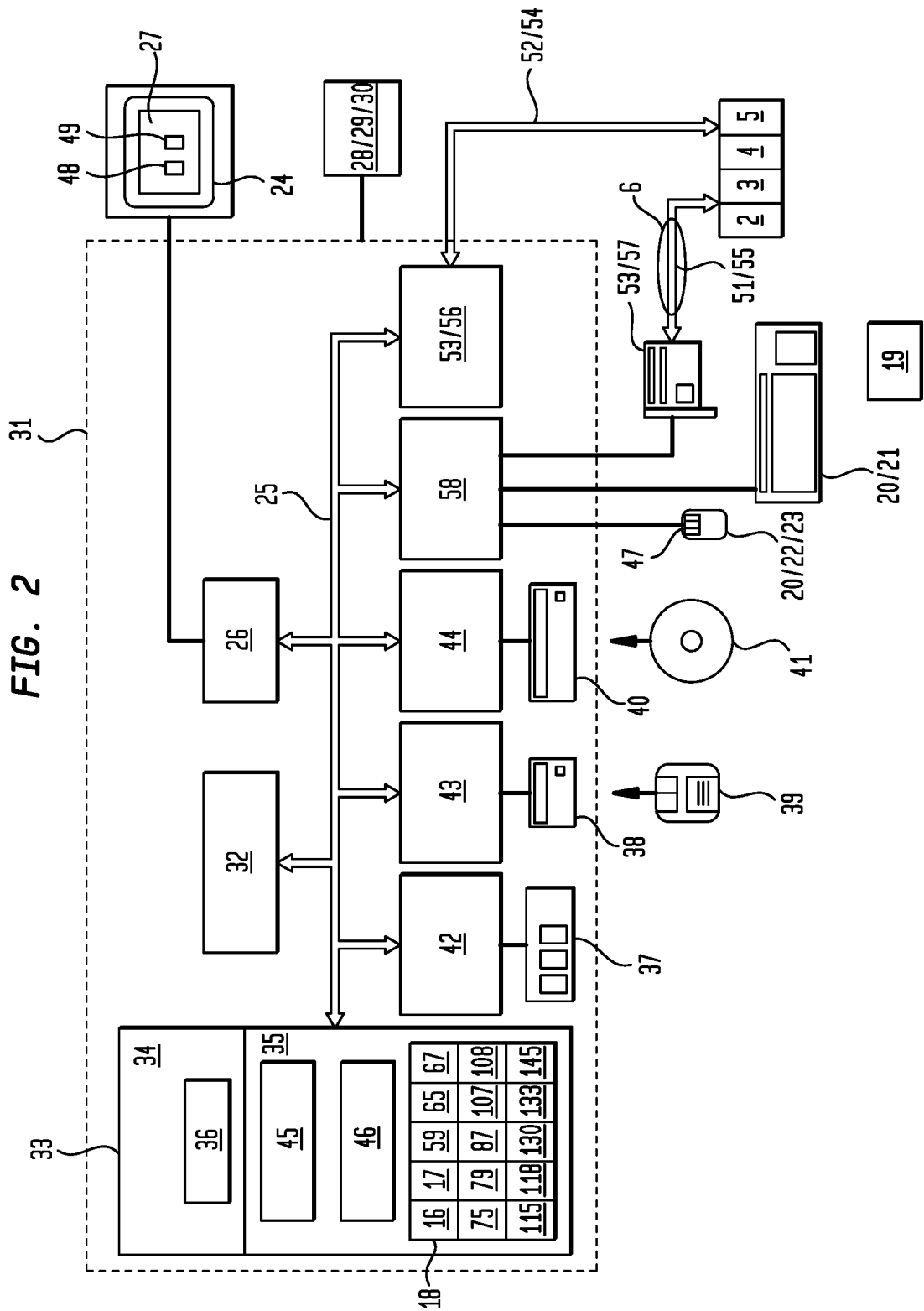
FIG. 2 is a block diagram of an illustrative computer means, network means and computer-readable medium which provides computer-executable instructions to provide an embodiment of the interactive image selection and display system.

Now referring primarily to FIGS. 1 and 2, which generally illustrate computer means, certain network means, and computer readable media which can be utilized to practice embodiments of the invention. It is not intended that embodiments of the invention be practiced in only wide area computing environments or only in local computing environments, but rather the invention can be practiced in local computing environments or in distributed computing environments where functions or tasks are performed by remote processing devices that are linked through a communications network. In a distributed computing environment, program modules may be located in both a local or in a remote memory storage device(s) or device elements.

Also while a preferred embodiment of the invention is described in the general context of a processor in communication with a memory which includes a computer code or computer-executable instructions such as an application program and program modules which utilize routines, programs, objects, components, data structures, or the like, to perform particular functions or tasks or implement particular abstract data types, or the like, it is not intended that embodiments of the invention be limited to a particular computer code, set of computer-executable instructions or protocols.

Now referring to primarily to FIG. 1, one or more client devices (1) can be configured to connect with one or more server computers (2)(3)(4)(5) through a wide area network (55), such as the Internet (6), or one or more local area networks (54) to transfer (8)(9)(10)(11) corresponding images and data (12)(13)(14)(15). As to particular embodiments, the one or more client devices (1) can take the form of a limited-capability computer designed specifically for navigation on the World Wide Web of the Internet (6). Alternatively, the one or more client devices (1) might be set-top boxes, intelligent televisions connected to receive data through an entertainment medium such as a cable television network or a digital satellite broadcast, hand-held devices such as smart phones, slate or pad computers, personal digital assistants or camera/cell phone, or multi-processor systems, microprocessor-based or programmable consumer electronics, network PCs, minicomputers, mainframe computers, or the like.

Again referring primarily to FIGS. 1 and 2, in general, each of the one or more client devices (1) can include an Internet browser (16) such as Microsoft's INTERNET EXPLORER, GOOGLE CHROME, MOZILLA FIREFOX, or the like, which functions to download and render multimedia content that is formatted in "hypertext markup language" (HTML). In this environment, a first server computer (2) might be programmed to implement the most significant portions of a user interface (17). As to these embodiments, the application program (18) which implements the user interface (17) can be resident in the first server computer (2)(as shown in the example of FIG. 1) and the one or more client devices (1) can use the browser (16) to simply display downloaded content and to relay user inputs back to the first server computer (2). The first server computer (2) would respond by formatting new screen displays (as shown in the illustrative examples of FIGS. 3-4 and 9-10) and downloading them for display on one or more of the client devices (1).

In other embodiments, the one or more server computers (2)(3)(4)(5) can be used primarily as sources of images and data (12)(13)(14)(15), with primary responsibility for implementing the user interface (17) being placed upon each of the one or more client devices (1)(as shown in the example FIG. 2). As to these embodiments, each of the one or more client devices (1) can run the application program (18)(also referred to as the "image selection and display application program") implementing the user interface (17), to retrieve images and data (13) from a second server computer (3), advertising images and data (14) from a third server computer (4), and a user content (15) from a fourth server computer (5). While illustrative examples in this description attribute a certain type of data to a certain server computer for clarity, it is to be understood that various types of data may reside in one server computer or one type of data can be distributed among a plurality of server computers and embodiments of the invention can utilize server computers (2)(3)(4)(5) to a lesser or greater extent depending upon the application. The application program (18) further operates to provide images and data (12)(13)(14)(15) obtained from one or more server computers (2)(3)(4)(5) in a common format, as further described below.

A user (19) can enter commands and information into one or more client devices (1) through input devices (20) such as a keyboard (21) or a pointing device (22) such as a mouse (23); however, any method or device that converts user (19) action into commands and information can be utilized including, but not limited to: a microphone, joystick, game pad, touch screen, or the like. A display surface (24) such as a monitor screen or other type of display device can also be connected to a bus (25) via a video display interface (26), such as a video adapter, or the like. The user interface (17) can in part be presented as an interactive graphic user interface (27) on the display surface (24). In addition to the display surface (24), each of the one or more client devices (1) can further include other peripheral output devices (28) such as speakers (29) and printers (30); although the peripheral output devices (28) are not so limited.

Now referring primarily to FIG. 2, as an non-limiting example of a client device (1), a client computer (31) can provide a processing unit (32), one or more memory elements (33), and a bus (25) (which operably couples components of the client computer (31), including without limitation the memory elements (33) to the processing unit (32). The processing unit (32) can comprise one central-processing unit (CPU), or a plurality of processing units which operate in parallel to process digital information. The bus (25) may be any of several types of bus configurations including a memory bus or memory controller, a peripheral bus, and a local bus using any of a variety of bus architectures. The memory element (33) can without limitation be a read only memory (ROM) (34) or a random access memory (RAM) (35), or both. A basic input/output system (BIOS) (36), containing routines that assist transfer of data between the components of the client computer (31), such as during start-up, can be stored in ROM (34). The client computer (31) can further include a hard disk drive (37) for reading from and writing to a hard disk (not shown), a magnetic disk drive (38) for reading from or writing to a removable magnetic disk (39), and an optical disk drive (40) for reading from or writing to a removable optical disk (41) such as a CD ROM or other optical media. The hard disk drive (37), magnetic disk drive (38), and optical disk drive (40) can be connected to the bus (25) by a hard disk drive interface (42), a magnetic disk drive interface (43), and an optical disk drive interface (44), respectively. The drives and their associated computer-readable media provide nonvolatile storage of computer-readable instructions, data structures, program modules and other data for the client computer (31). It can be appreciated by those skilled in the art that any type of computer-readable media that can store data that is accessible by a computer, such as magnetic cassettes, flash memory cards, digital video disks, Bernoulli cartridges, random access memories (RAMs), read only memories (ROMs), and the like, may be used in a variety of operating environments. A number of program modules may be stored on or included in the hard disk drive (37), magnetic disk (39), optical disk (41), ROM (34), or RAM (35), including an operating system (45), one or a plurality of application programs (46) and in particular the image selection and display application program(s) (18) which implement the user interface (17) or other program interfaces.

A "click event" occurs when the user (19) operates a application function through the use of a command which for example can include pressing or releasing the left mouse button (47) while a pointer (48) is located over a control icon (49)(or other interactive field which activates a function) displayed in the graphic user interface (27). However, it is not intended that a "click event" be limited to the press and release of the left button (47) on a mouse (50) while a pointer (48) is located over a control icon (49)(or field), rather, a "click event" is intend to broadly encompass a command by the user (19) through which a function of image selection and display application program (18)(or other program, application, module or the like) including the user interface application (17) which implements the graphic user interface (27) can be activated or performed, whether through selection of one or a plurality of control icon(s) (49) or fields, or by user voice command, keyboard stroke, mouse button, touch on a touch screen, or otherwise. It is further intended that control icons (49) can be configured or displayed without limitation as a bullets, point, a circle, a triangle, a square, a polygon (or other geometric configurations or combinations or permutations thereof), or as fields or boundary elements created in displayed images, or as fields in which locations, addresses, or other terms can be entered manually or by operation of the image selection and display application program (18), or a portion or element thereof, such as: a street address, a zip code, a county code, a natural area code, a latitude/longitude, projected coordinate X and Y, or other notation, script, character, or the like.

The client computer (31) may operate in a networked environment using one or more logical connections (51)(52) to connect to one or more of server computers (2)(3)(4)(5). These logical connections (51)(52) can be achieved by one or more communication devices (53) coupled to or a part of the client computer (31); the invention is not limited to a particular type of communications device (53). The one or more server computers (2)(3)(4)(5) can be another computer, a server, a router, a network PC, a client, a peer device or other common network node, and can include a part or all of the elements above-described relative to the client computer (31). The logical connections (51)(52) depicted in FIG. 2 can include a local-area network (LAN) (54) or a wide-area network (WAN)(55). Such networking environments are commonplace and include for example: enterprise-wide computer networks, intranets, wireless networks, global satellite networks, cellular phone networks and the Internet (6), or the like.

When used in a LAN-networking environment, the client computer (31) can be connected to the LAN (54) through a network interface (56) or adapter, which is one type of communications device (53). When used in a WAN-networking environment, the client computer (31) typically includes a modem (57), a type of communications device (53), or other type of communications device for establishing communications over the WAN (55), such as the Internet (6)(as shown in the example of FIG. 1). The modem (57), which may be internal or external, is connected to the bus (30) via the serial port interface (58). In a networked environment, program modules depicted relative to the client computer (31), or portions thereof, may be as to certain embodiments of the invention be stored in the one or more server computers (2)(3)(4)(5) (as shown in the examples of FIGS. 1 and 2). It is appreciated that the network connections shown are exemplary and other means of and communications devices for establishing a communications link between the computers can be used.

Again referring primarily to FIGS. 1 and 2, the client computer (31) can encompass a single client computer or can encompass a plurality of client computers (31) each of which can be operated by a user (19). The user (19) can be a person, a plurality of persons, a business entity, or otherwise, can access to the image selection and display application program (18) including the user interface (17) to retrieve data and images (12)(13)(14)(15) from one or more server computers (2)(3)(4)(5) in a common format for display in the graphic user interface (27) on display surface (24).

Now referring to FIGS. 1, 3 through 5, and 8 through 10 which show an exemplary embodiment of the graphic user interface (27) in accordance with the invention. The graphic user interface (27) can be implemented using various technologies and different devices, depending on the preferences of the designer and the particular efficiencies desired for a given circumstance. By click event the user (19) can activate the image selection and display application program (18) which in part functions to operate the user interface module (17) which functions to display an interactive graphic user interface (27) on a display surface (24). The application program (18) further includes a visual navigation space generator (59) which generates a visual navigation space (60). The visual navigation space (60) can take any viewable form having any number of dimensions, any manner of symmetry, geometric properties, whether finite or infinite, which can be adapted to allow selection whether serially or simultaneously one or a plurality of locations (61)(whether by pointer, coordinates such as X, Y or X, Y, Z, drop down list, key word in a search field (62), photograph or data locations, photo captions, photo attribute data generated by a camera or other devices, location related advertising information, keywords derived from advertising information or search criteria derived from all of the above, or the like) within the visual navigation space (60).

Figure 3:
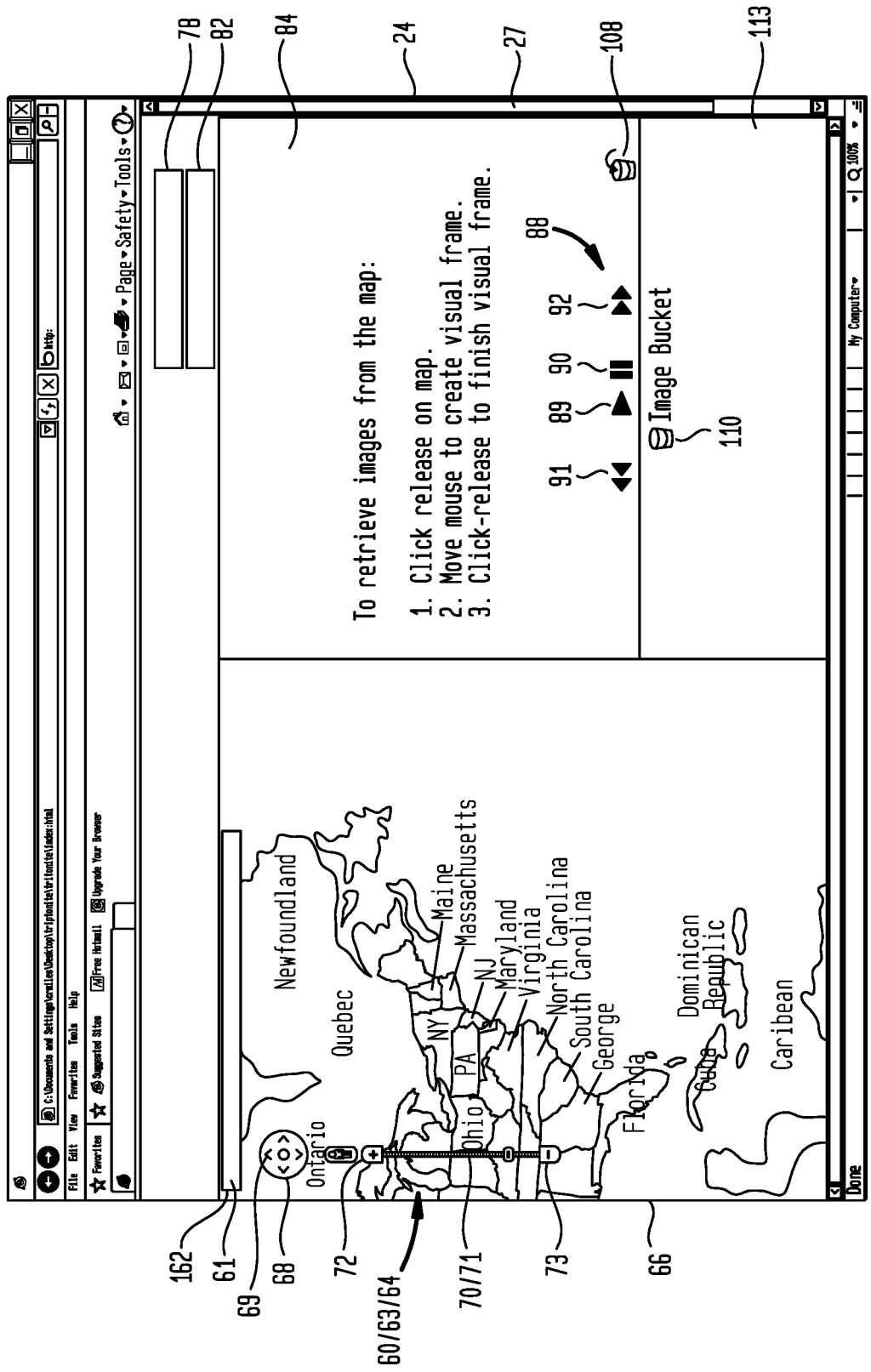
FIG. 3 is an illustration of particular embodiment of a graphic user interface which displays in a common data format a visual representation of an area in a first visual field of a display surface.

In the example provided by FIG. 3, the visual navigation space generator (59) retrieves from a first computer server database (2) a visual navigation space (60) in the form of a visual representation of an area (63), whether in whole or in part, which can be continuous or discontinuous, and displayed on a display surface (24) as a graphical, an aerial, a satellite, or other image form. For example, the application program (18) can access a first server computer (2) which can serve as examples GOOGLE MAPS, MAPQUEST, PANORAMIO, or the like, to retrieve and display the visual representation of an area (63) which can be in the form of a map (64)(regardless of visual form such as a geographic representation of an area, a geo-planar map, a photograph, or the like) and as to certain embodiments a visual field generator (65) can display a first visual field (66) on the display surface (24). In the illustrative example of FIG. 3, the visual representation of an area (63) is in the form of a stylized geographic representation of an area or geographic map (64) including, at the displayed scale, the East Coast of the United States and Caribbean and further including certain geographic and administrative boundaries such as such as states, counties, cities, towns or residential areas and upon increasing scale further including roadways, and prominent geographic and manmade structures, or the like; however, it is not intended that embodiments of the visual representation of an area (63) necessarily include indicators of geographic or administrative boundaries, roadways, or the like.

A navigation controller (67) can be operably coupled to the visual representation of the area (63) to allow the visual representation of the area (63) to be moved directionally on the display surface (24) (for example with a pan tool) to display areas of the visual representation of an area (63) which at the displayed scale, lie outside of the display surface (24) or as to certain embodiments outside of the first visual field (66). As to certain embodiments, the navigation controller (67) can take the form of navigation controls (68) displayed on the display surface (24). As to certain embodiments, the navigation controls (68) can be displayed in the form of one or more arrows (69) correspondingly pointing in one or more cardinal directions. An arrow (69) by click event activates the application program (18) to move the view of the representation of the area (63) directionally on the display surface (24) (as shown in the example of FIG. 3 North, South, East, or West)

The navigation controller (67) can further include an image scale control (70) operably coupled to the visual representation of the area (63) to allow the representation of the area (63) to be increased or decreased in scale on the display surface (for example with a zoom tool). As to certain embodiments, the image scale control (70) can be displayed on the display surface (24) in the form of a slider element (71) which can be dragged up or down to correspondingly increase or decrease the scale of the visual representation of an area (63) viewed on the display surface (24) and can further include a plus icon (72) or a minus icon (73) which by click event correspondingly increases or decreases scale of the visual representation of an area (63). However, these examples of directionally moving and altering scale of the visual representation of an area (63) are illustrative and other embodiments can allow the visual representation of an area (63) to be directionally moved or altered in scale by click event including one or more of key stroke, mouse drag, menu, toolbar, or the like.

Figure 4:
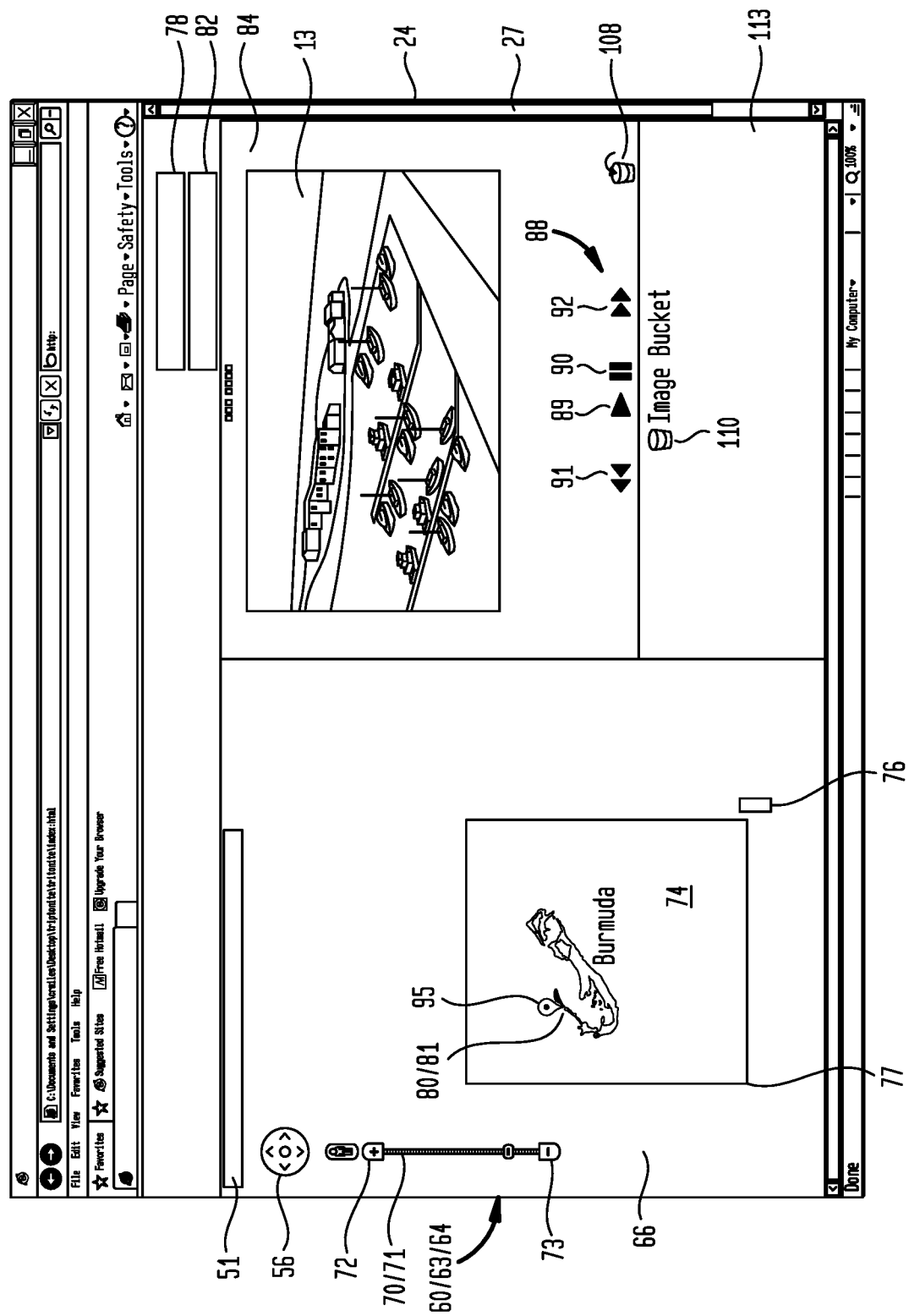
FIG. 4 is an illustration of a particular embodiment of a graphic user interface which displays in a common data format a visual representation of an area in which a user interacts to generate or establish a visual frame which bounds a target area for retrieval of a plurality of images displayed in a second visual field in serial time bound presentation.

Now referring primarily to FIG. 4, the user (19) can interactively select a target area (74) within the visual representation of the area (63) displayed on the display surface (24). As to particular embodiments, a visual frame generator (75) of the application program (18) can display a cursor (76) or other type of viewable indicia on the display surface (24) which allows the user (19) by click event to establish a visual frame (77) about a target area (74) in the visual representation of an area (63). While the visual frame (77) shown in the example of FIG. 4 includes a substantially square boundary which bounds and defines a substantially square target area (74); the user (19) can establish the visual frame (77) in the visual representation of the area (63) in any manner which bounds at least a portion of the visual representation of the area (63). As shown by the illustrative examples of FIGS. 5A through 5C, the visual frame can be configured by the user (19) as a rectangle, circle, oval, irregular polygon, free form shape, or otherwise.

Again referring primarily to FIG. 5, as to particular embodiments, the user (19) can adjust the visual frame (77) displayed in the visual representation of an area (63), as above described, or based on selection of one or more target area criteria (78), or both. The target area criteria (78) can be any area which can be defined in a coordinate system, such as Cartesian, Cylindrial Polar, Spherical Polar, or other user defined coordinate system. As examples, target area criteria (78) can include one or more of, or be selected from the group consisting of: a continent, a country, a state (as shown in the example of FIG. 3), a county, a city, a neighborhood, a latitude coordinate, a longitude coordinate (as shown in the examples of FIG. 5A through 5C), an elevation coordinate, a postal zone area, a political area, an administrative area, a polygon calculation area, an centroid area (as shown in FIG. 5B), one or more latitude/longitude coordinates (as shown in the example of FIGS. 5A and 5C), a habitat area, a watershed area, a geographic boundary data area, a demographic data boundary area, or the like, and combinations thereof.

The target area criteria (78) can be displayed on the display surface (24) in any manner which allows clickable selection by the user (19) and by way of illustrative example: drop down lists including countries, states, counties, cities, towns, zip codes, or the like; search fields (62) (as shown in the example of FIG. 1) in which street addresses, zip codes, county codes, natural area codes, latitude/longitude coordinates or projected coordinate X and Y, polygon coordinates, centroid area coordinates, or the like, can be entered manually or entered automatically by operation of the application program (18), or a portion or element thereof.

Selection of the target area (74) whether by use of a cursor (76) or other indicator in the visual representation of an area (63) or by selection of target area criteria (78) activates an image retrieval module (79) of the image selection and display application program (18). The image retrieval module (79) functions to retrieve from a second server computer (3) one or more images (13) each matched or otherwise associated with an image location (80) having location coordinates (81) within the target area (74) of the visual representation of an area (63).

As to particular embodiments, the user (19) can further limit retrieval of images (13) within the target area (74) based on selection of one or more image database categories (82). A database category (82) can be any category which can be matched to one or more specific databases or portions thereof for the purpose of retrieving a subset of data and images (12)(13)(14)(15). Examples of image database categories (82) include or can be selected from the group consisting of: a residential housing database, a rental property database, an automobile database, a vacation home database, a commercial property database, a retail sales location database, a restaurant location database, a movie theatre database, a WiFi hotspot database, a trails database, a local parks database, a state parks database, a national parks database, travel destinations database, a hotels database, a transportation database, a beaches database, a music venue database, a URL location database, a mobile ID database, a travel advertising database, a travel provider database, an airline database, a rental car database, a travel agent database, a webcam database, a traffic condition database, a weather condition database, a crime location database, a news event database, and a past events database.

The image database categories (82) can be displayed on the display surface (24) in any manner which allows clickable selection by the user (19) and by way of illustrative example: drop down lists, visual fields in which particular database access information such as an Internet protocol address, or the like, can be entered manually or entered automatically by operation of the application program (18), or a portion or element thereof.

The term "image (13)" as used herein refers to a graphical representation which can be displayed on the display surface (24), along with the associated metadata or other data which matches, couples or links the image to the image location (80), location coordinates (81), date and time stamp, or other media (83) (whether or not displayable on the display surface) such as: a person, a place, an animal, an object, one or more characters, words or other media (83) such as video or video clips, or the like. Accordingly, the use of the term "image" whether as part of the description or claims does not limit the term to only graphical representations but further includes the associated data to implement use of the images (13) in accordance with any embodiment of the invention.

The image retrieval module (79) can further operate to display the one or more images (13) obtained or retrieved from the second server computer (3)(or other server computer or database) on the display surface (24). As to particular embodiments, the images (13) can be presented on the display surface (24) for viewing as a series of still images (also referred to as serial order display or serially displayed). The series of still images (13) can be presented in random order or in some degree of pre-determined order. Particular embodiments provide time bound presentation of each image in serial order (each image in serial order displayed for a duration of time). As to particular embodiments, the visual field generator (65) can concurrently display a second visual field (84) discrete from the first visual field (66) in which the images (13) can be displayed. The image retrieval module (79) can further function to display a visual location indicator (85) to identify the image location (80) matched to an image (13) displayed on the display surface (24). The visual location indicator (85) can be displayed during the period of time corresponding to display of an image (13) on the display surface (24) or highlighted (by change in color, size, shape, or the like) in relation to other visual location indicators (85) during the period of time corresponding to display of an image (13) on the display surface (24).

As to particular embodiments, the user (19) can alter order of serial presentation of the images (13) by selection of one or more serial order display criteria (86). Illustrative examples of serial order display criteria (86) include or can be selected from the group consisting of: an image creation location, an image creation date, an image creation time, a cardinal direction, a first cardinal direction toward a second cardinal direction, a first geographic location toward a second geographic location, or the like, or combinations thereof.

The serial order display criteria (86) can be displayed on the display surface (24) in any manner which allows clickable selection by the user (19) and by way of illustrative example: drop down lists which include random order, serial ordering based on category of subject matter such as parks, beaches, restaurants, bars, or the like; serial ordering based on countries, states, counties, cities, towns, zip codes, serial ordering based on time of image creation, or the like; visual fields which allow serial ordering based on street addresses, zip codes, county codes, natural area codes, latitude/longitude coordinates or projected coordinate X and Y, polygon coordinates, centroid area coordinates allowing serial ordering of from the center point outward, travel route, or the like, can be entered manually or entered automatically by operation of the application program (18), or a portion or element thereof.

Again referring primarily to FIGS. 3 and 4, the application program (18) can further include a visual image presentation controller (87) which allows the user (19) to control presentation of a plurality of images (13) on the display surface (24) and as to particular embodiments in the second visual field (84). As to certain embodiments, the visual image presentation controller (87) generates image presentation controls (88) on the display surface (24). As shown in the example of FIG. 4, a start control (89) by click event commences serial presentation of images (13) on the display surface (24) in the second visual field (84). A pause control (90) by click event pauses presentation of images (13), a rewind control (91) which by click event re-presents images (13) in reverse serial order, a fast forward control (92) which by click event increases the rate at which images (13) serially presented in the second visual field (84). As to certain embodiments, the visual image presentation controller (87) further functions to allow adjustment of the time duration of image display on the display surface (24).

As shown by the illustrative example of FIG. 4 and FIGS. 5A through 5C and 6, the user (19) can select a portion of the visual representation of an area (63), as above described, in a first visual field (66). The user (19) can then generate a visual frame (77), as above described, which in the illustrative example of FIG. 4 surrounds the Bermuda area and by click event the user (19) selects the visual frame (77) to define the Bermuda area as the target area (74). As shown in FIG. 5A, the visual frame (57) can define a subset of location coordinates (81)(X and Y) included in the target area (74) bound by the visual frame (57) and the image retrieval module (79) can retrieve and display images matched to the subset of location coordinates (81)(X and Y) bounded by the visual frame (77). As shown in FIG. 6, a first data structure (93) lists all images (13) retrievable from one or more server computers based on the selected visual representation of the area (53). The images (identified as images 1-5 under the column "Image ID" (94)) have pairs of location coordinates X and Y (listed respectively under columns "X" (95) and "Y" (96)) located within the visual representation of the area (63) that can be retrieved from one or more of the server computers (2)(3)(4)(5). Now referring to FIG. 7, a second data structure (97) lists the subset of all images (13) retrievable from one or more server computers (2)(3)(4)(5) based on the target area (74) defined by the visual frame (77). The images (13) (identified as images 1-3 under the column "Image ID" (94)) have pairs of location coordinates (81) (listed respectively under columns "X" (95) and "Y" (96)) located within the target area (74) that can be retrieved from one or more of the server computers (2)(3)(4)(5).

Again referring to FIGS. 6 and 7, the user (19) by click event can further select one or more image database categories (82) (shown in the examples of FIGS. 6 and 7 under "Database 1" (98) and "Database N" (99)) to correspondingly narrow the retrieval of a plurality of images (13) to certain databases or portions thereof which may be located in one or more server computers 2)(3)(4)(5). In the example of FIG. 7, the image database categories (82) selected "Hotel Database" (100) and "Restaurant Database" (101) and further corresponding selection of "Beach Database" (102) and "Mountain Database" (103) further depending from the Hotel Database (100) and "Italian" (104) as further depending from the Restaurant Database (101) limited the retrieval of images (13) to those including either hotels associated with beaches or mountains or restaurants associated with Italian. Understandably, any image (13) can be included in one or more databases and can include metadata or other data to allow retrieval based upon user (19) selection of one or more associated database categories (82).

The image retrieval module (79) retrieves images (13) from image locations (80) within the Bermuda area as bounded by the visual frame (77) as further limited by selection of the image database categories (82), and displays in time bound serial order presentation images (13) in the second visual field (84) of the graphic user interface (27) (the example of FIG. 4 displaying "Image ID-1" (105) an image (13) of a hotel associated with a beach). Also as shown in FIG. 4 the image retrieval module (79) can further function to correspondingly generate a visual location indicator (85) in target area (74) which identifies (or highlights or both) the image location (80) of the image (13) of the hotel associated with the beach (Image ID-1 (105)). If, as a second illustrative example, the user (19) selected the image database category (82) "Rental Property" (106), then the image retrieval module (79) would function to retrieve a plurality of images (13) within the Bermuda area only from rental property databases and order the plurality of images (13) for rental properties for serial presentation in the second visual field (84).

Now referring primarily to FIG. 8, the image selection and display application program (18) can further include an advertisement image retrieval module (107). The advertisement image retrieval module (107) functions to search and retrieve from a third server computer (4) one or more advertisement images (14) from within the target area (74) (or coupled to location coordinates (81) within the target area (74)) of the visual representation of an area (63) selected by the user (19). The term "advertisement image" broadly encompasses a representation of a person, animal, thing, logos, words, or other information utilized to offer a product or service and further includes associated metadata or other data which couples or links the image to the image location (80), location coordinates (81), date and time stamp, or to a variety of other media (83) which may or may not be displayed on the display surface (24). The advertisement image retrieval module (107) operates to coordinate the serial time bound presentation of the advertisement images (14) interspersed with the images (13) retrieved by the image retrieval module (79) in the second visual field (84). The advertisement image retrieval module (107) further generates a visual location indicator (85) to identify within the target area (74) the advertisement image location (80)(location coordinates (81)) matched to each presented advertisement image (14). As shown in the illustrative example of FIG. 5, the user (19) generates a visual frame (77) which surrounds the Bermuda area and by click event selects the Bermuda area as the target area (74). The advertisement image retrieval module (107) retrieves advertisement images (14) from locations within the Bermuda area and presents the advertisement images (14) in the second visual field (84) of the graphic user interface (25), such as the advertisement image (14) of the Grotto Bay Beach Resort Bermuda shown in FIG. 5 and correspondingly generates a visual location indicator (85) in target area (74) which identifies the image location (80)(location coordinates (81)) of the Grotto Bay Beach Resort in the Bermuda area.

Now referring primarily to FIG. 8, the application program (18) further includes an image selection control (108) which allows the user (19) to select one or more of the images (13) or advertising images (14) displayed on the display surface (24). As to certain embodiments, the image selection control (108) allows the user (19) to select an image (13) during serial display on the display surface (24) or time bound serial display in the second visual field (84) depending upon the embodiment. The image selection control (108) by click event corresponding with the presentation of an image (13)(or advertisement image (14)) functions to discretely retrievably store one or more selected images (109) and associated media (83) in a portion of a memory (33). In FIG. 8, the image selection control (108) functions to display an image bucket icon (110) on the display surface (24) which can be activated by click event to select one more images (13)(14) to be retrievably retained in memory (33) (also shown in the example of FIG. 8 as an image bucket (111)); however, the invention is not so limited, and the image selection control (108) take the form of any manner of click event.

As to particular embodiments, the image selection control (108) can further function to display selected images (109) on the display surface (24). A shown in the example of FIG. 8, the selected images (109) can be displayed as one or more still images (112) in a third visual field (113) concurrently displayed with the first and second visual fields (66)(84) on the display surface (24). The image selection control (108) can further function to present proximate each selected image (109) displayed on the display surface (24) a media retrieval icon (114) which by click event activates a link to connect the client device (1) with the media (83) matched with the selected image (109) for retrieval and display on the display surface (24).

The application program (18) can further include a save module (115) which allows the user (19), having selected images (109) associated with the target area (74) within the visual representation of an area (63), to retrievably save the image bucket (111) as an image bucket file (116) in a image file database (117) of a fourth computer server (5) or of the client device (1). The image bucket file (116) can include all the selected images (109) and associated media (83) along with the visual representation of an area (63) retaining the target area (74). The save module (115) can be activated by click event. As shown in the example of FIG. 8, by click event of the image bucket (111) on the display surface (24).

The application program (18) can further include a retrieval module (118) which by click event allows retrieval of an image bucket file (116) from the fourth computer server (5) which and functions to open the image bucket file (116) to display on the display surface (24) the visual representation of the area (63) including the visual frame (77)(which can be displayed in the first visual field (66)) and the selected images (109) in the image bucket file (116) along with the associated media retrieval icons (114) (which can be displayed in the third visual field (113)). Use of the start control (89) activates the image retrieval module (79) which commences time bound serial presentation of additional images (13) and advertisement images (14) on the display surface (24) (which can be in the second visual field (84)), as above described.

The user (19) can adjust the target area (74) as above described to include a greater or lesser target area (74) from which the image retrieval module (79) retrieves matched images (13) and advertisement images (14) from the corresponding second computer server (3) and third computer server (4). As to particular embodiments of the invention, the act of increasing the target area (74) bound by a visual frame (77) to extend a portion of the target area (74) bound by the visual frame (77) can correspondingly include images (13)(14) and associated media (83) matched to the extended portion (119) of the target area (74) for serial ordered presentation on the display surface (24)(as shown in the example of FIG. 8). As to particular embodiments of the invention, the act of reducing the target area (74) bound by a visual frame (77) to exclude a portion of the target area (74) bound by the visual frame (77) can correspondingly exclude that portion of the images (13)(14) and associated media (75) matched to the excluded portion (120) of the target area (74) which removes the images (13)(14) from or for serial ordered presentation on the display surface (24)(as shown in the example of FIG. 8). As to particular embodiments, the image retrieval module (79) can further function to delete that portion of the selected images (109) and associated media (83) corresponding to the excluded portion (120) which are included in the image bucket file (116) and can further function to remove this portion of the still images (112) and associated media (83) from display on the display surface (24).

The user (19) can then interact with the graphic user interface (25) as above described to select additional images (13)(14) serially presented on the display surface (24) (which can be in the second visual filed (84)) for still presentation on the display surface (24)(which can be in the third visual field (113)) along with the associated media retrieval icons (114) and by click event added to the image bucket file (76). The revised image bucket file (76) can be retrievably saved to the fourth computer server (5).

Now referring primarily to FIG. 9, the image selection and display application program (18) can further include an image bucket edit module (130) which allows the user (19) to delete one, a plurality, or all of the selected images (109) from the image bucket (111) and from display on the display surface (24)(which can be in the third visual field (113)). As a non-limiting example, as illustrated in FIG. 9, the user (19) can by click event on a delete image icon (121)(the "X" icon (122) shown in the example of FIG. 9) to delete particular selected images (109) from still image (112) display on the display surface (24) (which can be in the third visual field (113)), or can delete all of the selected images (109) by click event on a delete bucket icon (123)(the "Clear" icon (124) shown in the example of FIG. 9). The image bucket edit module (130) can further function to alter the scale of the visual representation of an area (63) or target area (74) bounded by the visual frame (77)(which can be displayed in the first visual field (66)) concurrent with the deletion of still images (112) from the display surface (24) (in the third visual field (113)). For example, if the user (19) removes one or more of the still images (112) in the third visual field (113), the image bucket edit module (130) correspondingly adjusts the boundary of the visual representation of an area (63), the visual frame (77) and the corresponding target area (74), if a lesser area encompasses all the locations (80) of the still images (112) displayed in the third visual field (113).

Similarly, if the user (19) by selection of images (13)(14) serially displayed on the display surface (24)(which can be in the second visual field (84)) or from another image database (125) adds a selected image (109) to the display surface as a still image (112) (which can be in the third visual field (113)) or to the image bucket (111), the trip bucket edit module (130) correspondingly functions to adjust or alter the scale of the visual representation of an area (63), if a lesser scale is necessary to encompass all the locations (80) of the selected images (109) displayed as still images (112) on the third visual field (113) or retained in the image bucket (111) and can further function to alter or extend the visual frame (77) and the corresponding target area (74) to encompass all the image locations (80) of the selected images (109). The adjusted bounds of the visual representation of an area (63)

can be displayed by click event on image bucket area view icon (125). In the illustrative example shown in FIG. 9, the user (19) can display the adjusted bounds of the visual representation of an area (63) by click event on the "Map View" icon (126).

Now referring primarily to FIGS. 1, 2 and 10, the image selection and display application program (18) can further include an image bucket transfer module (133) which can function to display a second interactive graphic user interface (127) which allows the user (19) to transfer (11) a image bucket file (116) along with the image selection and display application program (18), in whole or in part, to one or more client devices (1) allowing a plurality of users (19) to share and revise the image bucket file (116). As illustrated in FIG. 9, the user (19) can by click event display the second interactive graphic user interface (127). The selected images (109) can be concurrently displayed as still images (112) in a first visual field (128) of the second graphic user interface (127) with delete image icons (121) as above described. The target area (74) can be displayed in a second visual field (129) of the second graphic user interface (127) including a visual location indicator (85) showing the image location (80) of each still image (112). A transfer image bucket icon (131)(for example the "share icon" (132) as shown in FIG. 10) can by click event activate the save module (115) to save the selected still images (112) displayed in the first visual field (128) of the second user interface (127) along with associated media (83) and data to a image bucket file (116). The image bucket transfer module (133) further functions to couple a link (145) to the image bucket file (116) to be shared. The image bucket transfer module (133) can further display a link image (146) in a link image area (135) of a third visual field (136) of the second user interface (127). The user (19) can transfer (11) the interactive link image (134) to another client device (1) by e-mail or the like. The recipient user (19) can utilize the link image (146) to retrieve the contents of the image bucket file (116) associated with the link (145). The image selection and display application program (18) the provides the graphic user interface (27) in which the retrieved images and selected images (13)(14)(71) contained in the image bucket file (116) can be displayed and manipulated by the recipient user (19), as above described.

Now referring primarily to FIG. 1, one or more of the image bucket files (116) can uploaded or downloaded (135) to one or more server computers (136) and databases (137) separately or along with the image selection and display application program (18) including a product pricing request (138) to allow a plurality of vendors (139) to reply to an image bucket database (140) with product pricing information (141) on the image bucket file (116). As one example, the one or more image bucket files (116) can be uploaded or downloaded in the form of a trip organization and pricing request (142) to allow a plurality of travel providers (143) to reply to the image bucket database (140) with trip organization and pricing information (144) based on the trip bucket file (116).

As can be easily understood from the foregoing, the basic concepts of the present invention may be embodied in a variety of ways. The invention involves numerous and varied embodiments of an interactive image selection trip planning system including the best mode of the invention. As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "a computer" should be understood to encompass disclosure of the act of "computing"—whether explicitly discussed or not—and, conversely, were there effectively disclosure of the act of "computing", such a disclosure should be understood to encompass disclosure of "a computer" and even a "means for computing." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the interactive image selection and display devices herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A computer system, comprising:
one or more processors communicatively coupled to non-transitory computer readable memory containing program code, said program code executable to:
display a visual representation of a geographic area on a display surface of a computer;
generate a visual frame in said visual representation of said geographic area to bound a target area;
retrieve a plurality of images from one or more image databases, said plurality of images correspondingly matched to target locations in said target area;
select a subset of images from said plurality of images; and
adjust said visual representation of said geographic area to contain said target locations matched to said subset of images.

2. A computer system, comprising:
one or more processors communicatively coupled to a non-transitory computer readable memory containing a program code, said program code executable to:
display a visual representation of a geographic area on a display surface of a computer;
generate a visual frame in said visual representation of said geographic area to bound a target area;
retrieve a plurality of images from one or more image databases, said plurality of images correspondingly matched to a plurality of target locations in said target area;
select a subset of target locations from said plurality of target locations; and
display said visual representation of said geographic area adjusted to contain said subset of target locations correspondingly matched to a subset of images.

3. The system according to claim 1 or 2, wherein said program code further executable to display said subset of images.

4. The system of 3, wherein said program code further executable to:
adjust said visual representation of said geographic area to exclude a portion of said visual representation of said geographic area matched to said target locations corresponding to deletion of one or more of said subset of images, or
extend a portion of said visual representation of said geographic area matched to said target locations corresponding to addition of one or more images from said image database into said subset of images.

5. The system according to claim 1 or 2, wherein said program code further executable to:
save data associated with said subset of images in said non-transitory computer readable medium; and
re-display said visual representation of said geographic area adjusted to contain said target locations matched to said subset of images based on said data associated with said subset of images.

6. The system according to claim 1 or 2, wherein said program code further executable to:
save data associated with said subset of ages in said one or more image databases; and
re-display said visual representation of said geographic area adjusted to contain said target locations matched to said subset of images based on said data associated with said subset of images.

7. The system of claim 5, wherein said program code further executable to transfer said data associated with said subset of images from said non-transitory computer readable medium.

8. The system of claim 6, wherein said program code further executable to transfer said data associated with said subset of images from said one of more image databases.

9. The system of 6, wherein said program code further executable to transfer a pricing request including said data associated with said subset of images.

10. The system according to 1 or 2, wherein said program code further executable to display a visual location indicator in said visual representation of said geographic area to identify each of said target locations matched to said plurality of images.

11. The system of 10, wherein said program code further executable to highlight each of said target locations matched to each of said subset of images.

12. The system according to claim 1 or 2, wherein said program code further executable to display said subset of images in serial order on said display surface.

13. The system according to claim 1 or 2, wherein said program code further executable to display a first visual field on said display surface, said visual representation of said geographic area displayed in said first visual field.

14. The system of 13, wherein said program code further executable to display a second visual field on said display surface, said plurality of images displayed in said second visual field.

15. The system of 14, wherein said program code further executable to display a third visual field, said subset of images displayed in said third visual field.

* * * * *